(No Model.)

L. J. PURDY.
PATTERN TRACER.

No. 284,573. Patented Sept. 4, 1883.

Attest:
Charles Pickles
Albert G. Fish

Inventor:
Louise J. Purdy
By Knight Bros
Attys.

UNITED STATES PATENT OFFICE.

LOUISE J. PURDY, OF ST. LOUIS, MISSOURI.

PATTERN-TRACER.

SPECIFICATION forming part of Letters Patent No. 284,573, dated September 4, 1883.

Application filed August 29, 1882. (No model.)

*To all whom it may concern:*

Be it known that I, LOUISE J. PURDY, of the city of St. Louis, in the State of Missouri, have invented a certain new and useful Improvement in Pattern-Tracers, of which the following is a full, clear, and exact description, reference being had to the accompanying drawings, forming part of this specification, and in which—

Figure 2:
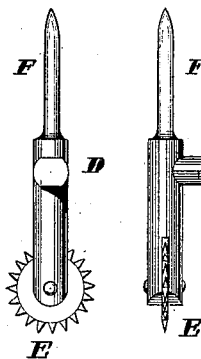
Figure 1:
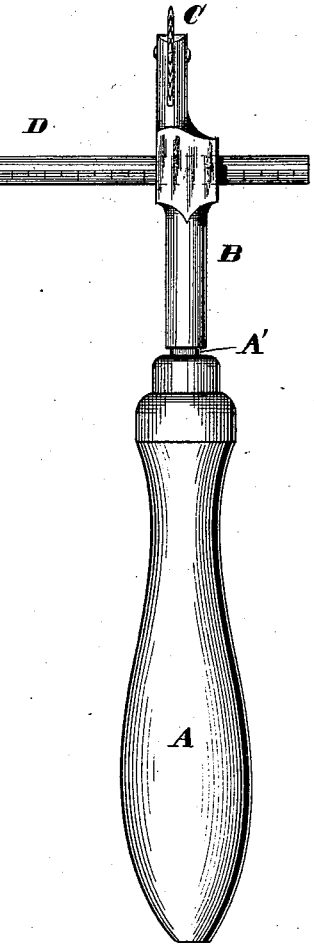
Figure 3:
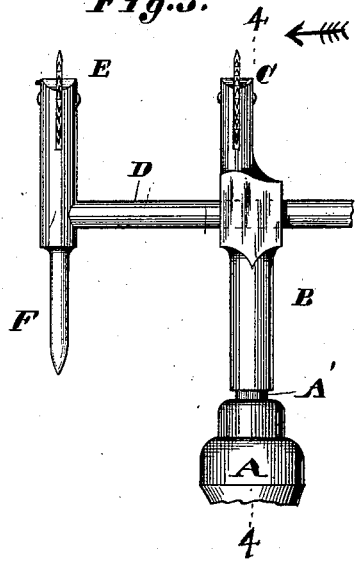
Figure 4:
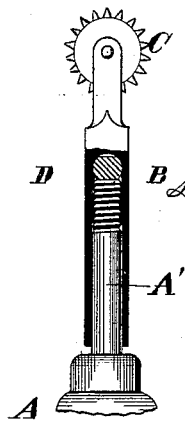

Figure 1 is an elevation, the compass-point being in working position. Fig. 2 is an end elevation of the adjustable tracer-wheel and compass-point arm removed from the handle. Fig. 3 is an elevation, the adjustable tracer-wheel being in working position. Fig. 4 is a vertical section on the line 4 4, Fig. 3, looking in the direction of the arrow.

My invention relates to those pattern-tracers which possess two star-wheels, one wheel being in a central position and the other wheel mounted on an adjustable arm.

My invention consists, broadly, in combining with a star or wheel-marker arm-head a compass-point for the purpose of marking curves, as hereinafter fully described.

Referring to the drawings, A represents the handle of the instrument, on the lower end of which is a screw-threaded pin, A', which works in the hollow stem B of a central star-wheel, C. This opening in the stem communicates with a transverse hole or opening, in which fits a headed adjustable arm, D, one end of the head having a star-wheel, E, and the other end being reduced, forming a compass-joint, F. The star-wheels are journaled in their bearings. By unscrewing the handle of the instrument the arm D is loosened and may be adjusted in either direction, and either the point or wheel brought around into working position, as shown in Figs. 1 and 3. The arm is preferably provided with a scale, as shown in Fig. 1, and with flat sides, as shown in Figs. 2 and 4, the former for the purpose of ascertaining the distance the adjustable wheel and compass are from the central wheel, and the latter effectually preventing any turning of the arm when the parts are in working position and the handle screwed down.

I claim as my invention—

1. In a pattern-tracer, an adjustable arm having a head provided at one end with a compass-point, and at the other end with a star-wheel, as set forth.

2. A pattern-tracer consisting of a suitable handle, a star-wheel journaled at the lower end, and an arm adjustable in said handle and provided with a head having at one end a compass-point and at the other end a star-wheel, as set forth.

LOUISE J. PURDY.

Witnesses:
GEO. H. KNIGHT,
M. A. BOONE.